United States Patent
Cho et al.

(10) Patent No.: US 7,963,760 B2
(45) Date of Patent: Jun. 21, 2011

(54) HEATER CARTRIDGE AND MOLDING APPARATUS HAVING THE SAME

(75) Inventors: Jin-hyun Cho, Seoul (KR); Jong-won Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 11/583,733

(22) Filed: Oct. 20, 2006

(65) Prior Publication Data

US 2007/0089473 A1    Apr. 26, 2007

(30) Foreign Application Priority Data

Oct. 24, 2005  (KR) .................. 10-2005-0100331
Nov. 18, 2005  (KR) .................. 10-2005-0110637
Nov. 21, 2005  (KR) .................. 10-2005-0111362

(51) Int. Cl.
*B29C 35/00* (2006.01)
*B29C 45/00* (2006.01)
*H05B 3/06* (2006.01)

(52) U.S. Cl. ............... 425/547; 425/144; 219/537

(58) Field of Classification Search .......... 425/547, 425/144; 219/537, 539
See application file for complete search history.

(56) References Cited

U.S. PATENT DOCUMENTS

| | | | |
|---|---|---|---|
| 3,441,712 A * | 4/1969 | Hynes | 219/539 |
| 4,593,182 A * | 6/1986 | Schwarzkopf | 219/544 |
| 4,642,043 A * | 2/1987 | Schwarzkopf | 425/547 |
| 5,095,193 A * | 3/1992 | Doyle | 219/536 |
| 5,443,540 A * | 8/1995 | Kamikawa | 34/471 |
| 5,575,941 A * | 11/1996 | Johnson | 219/544 |
| 5,821,498 A * | 10/1998 | Niskanen et al. | 219/469 |
| 6,298,669 B1 * | 10/2001 | Maruyama et al. | 62/3.2 |
| 2007/0023418 A1 * | 2/2007 | Schlipf | 219/532 |

FOREIGN PATENT DOCUMENTS

| | | |
|---|---|---|
| JP | 07-130457 | 5/1995 |
| JP | 08-230005 | 9/1996 |
| JP | 08-330058 | 12/1996 |
| JP | 10-074579 | 3/1998 |
| JP | 3058282 | 3/1999 |
| JP | 11-345030 | 12/1999 |
| JP | 2000-340343 | 12/2000 |
| JP | 2003-086512 | 3/2003 |
| JP | 2004-074619 | 3/2004 |

* cited by examiner

*Primary Examiner* — Maria Veronica D Ewald
(74) *Attorney, Agent, or Firm* — Roylance, Abrams, Berdo & Goodman L.L.P.

(57) ABSTRACT

A heater cartridge and a molding apparatus using the heater cartridge are provided. The molding apparatus includes a mold comprising at least one cartridge channel and a heater cartridge inserted to the cartridge channel, the heater cartridge comprising a main body casing, a plurality of heating sectors dividing an inside of the main body casing, and a heating part provided to at least one of the heating sectors to heat a predetermined area of the mold. The heater cartridge and molding apparatus having same provide uniform heating to enhance thermal efficiency and the quality of a product.

10 Claims, 10 Drawing Sheets

HEATER CARTRIDGE AND MOLDING APPARATUS HAVING THE SAME

CROSS-REFERENCE TO RELATED APPLICATIONS

This application claims the benefit under 35 U.S.C. §119 (a) of Korean Patent Application No. 2005-0100331, filed on Oct. 24, 2005, of Korean Patent Application No. 2005-0110637, filed on Nov. 18, 2005, and of Korean Patent Application No. 2005-0111362, filed on Nov. 21, 2005, all filed in the Korean Intellectual Property Office, the entire disclosures of all of which are hereby incorporated by reference.

BACKGROUND OF INVENTION

1. Field of Invention

The present invention relates to a heater cartridge and a molding apparatus having the same. More particularly, the present invention relates to a heater cartridge for uniformly heating a mold and a molding apparatus having the same.

2. Description of the Related Art

Generally, a molding apparatus injects a forming material into a mold having a predetermined shape to obtain a formed object having a predetermined shape. A molding process, that uses the molding apparatus, includes a plurality of stages. The molding process includes a heating stage for heating an area such as a cavity of the mold before injecting a forming material, and a cooling stage for cooling a formed object after injecting the forming material. The heating stage uses heated steam, heated water, and the like as a heat source.

The molding apparatus includes an upper mold moving upward and downward, a lower mold coupled to the upper mold, and a cavity formed by coupling of the upper mold and the lower mold so that a predetermined object is formed therein. The molding apparatus includes an injection unit formed with an injection hole through which a forming material such as resin is injected, and a flowing runner guiding the forming material from the injection hole to the cavity. The molding apparatus includes a heating part inserted to a cartridge channel formed through an inside of the upper and lower molds to heat the cavity. Thus, the forming material injected in the flowing runner and the cavity maintains a predetermined temperature to have fluidity. The molding apparatus includes a cooling channel, separately provided with respect to the heating part, inside the mold to cool a formed object after the forming material is completely injected, and a cooling medium pump circulating a cooling medium through the cooling channel.

The heating part heats the cavity and the flowing runner to have a predetermined temperature. Then, the forming material is injected from the injection unit to the cavity through the flowing runner. The heating of the cavity reduces a temperature difference between the forming material and the cavity which enhances the fluidity of the forming material and prevents the forming material from being rapidly cooled. Thus, inferiority thereof is reduced. After injection of the forming material is completed, the cooling medium pump circulates the cooling medium through the cooling channel to cool the formed object. Then, the upper and lower molds are separated, and the formed object is obtained from the cavity.

However, in the conventional molding apparatus, since the heating part heats the cavity and the flowing runner irrespective of the distance from the cavity or the flowing runner, the cavity is unevenly heated according to the distance from the heating part. Also, since the cartridge channel heated by the heater cartridge and the cooling channel are separately formed, the configuration thereof is complicated, and needs more installation space. Also, since the heating interferes with the cooling, the respective efficiencies thereof are deteriorated. Also, the conventional molding apparatus uses petroleum, and the like to obtain heated steam or heated water, thereby having a low thermal efficiency and needing a long heating time.

Accordingly, there is a need for an improved heater cartridge and molding apparatus using the same.

SUMMARY OF THE INVENTION

Exemplary embodiments of the present invention address at least the above problems and/or disadvantages and provide at least the advantages described below. Accordingly, it is an exemplary aspect of the present invention to provide a heater cartridge, and a molding apparatus having the same, which provides uniform heating to enhance thermal efficiency and the quality of a product.

It is another exemplary aspect of the present invention to provide a heater cartridge and a molding apparatus having the same which provides sequential heating and cooling through one heater cartridge.

It is another exemplary aspect of the present invention to provide a heater cartridge and a molding apparatus having the same which provides simultaneous heating and cooling.

It is another exemplary aspect of the present invention to provide a heater cartridge and a molding apparatus having the same which provides a simplified configuration for heating and cooling a mold to enhance an installation cost, a process cycle and a heating efficiency.

The foregoing and/or other exemplary aspects of the present invention can be achieved by providing a molding apparatus, comprising a mold, the mold comprising at least one cartridge channel and a heater cartridge inserted in the cartridge channel, the heater cartridge comprising a main body casing, a plurality of heating sectors dividing an inside of the main body casing, and a heating part provided to at least one of the heating sectors to heat an area of the mold.

According to an exemplary embodiment of the present invention, the amount of heat supplied from the heating part is proportionate to a distance between the area of the mold and the heating sector thereof.

According to an exemplary embodiment of the present invention, the molding apparatus further comprises a cooling medium pipe part provided through the main body casing to guide a cooling medium.

According to an exemplary embodiment of the present invention, the heating part is provided to at least one of the heating sectors which surround the cooling medium pipe part.

According to an exemplary embodiment of the present invention, the cooling medium pipe part comprises a plurality of radiating fins formed in an inner surface thereof.

According to an exemplary embodiment of the present invention, the main body casing is provided in a cylindrical shape.

The foregoing and/or other exemplary aspects of the present invention can be achieved by providing a heater cartridge for heating an object, comprising a main body casing, a plurality of heating sectors dividing an inside of the main body casing and a heating part provided to at least one of the heating sectors to heat the object.

According to an exemplary embodiment of the present invention, the amount of heat supplied from the heating part is proportionate to distance between the object and the heating sector thereof.

According to an exemplary embodiment of the present invention, the heater cartridge further comprises a cooling medium pipe part provided through the main body casing to guide a cooling medium.

According to an exemplary embodiment of the present invention, the heating part is provided to at least one of the heating sectors which surround the cooling medium pipe part.

According to an exemplary embodiment of the present invention, the cooling medium pipe part comprises a plurality of radiating fins formed in an inner surface thereof.

According to an exemplary embodiment of the present invention, the main body casing is provided in a cylindrical shape.

The foregoing and/or other exemplary aspects of the present invention can be achieved by providing a molding apparatus, comprising a mold, the mold comprising a cartridge channel formed therethrough, and a heater cartridge comprising a cooling medium pipe part guiding a cooling medium, and a heating part surrounding the cooling medium pipe part and inserted to the cartridge channel.

According to an exemplary embodiment of the present invention, the cooling medium pipe part comprises a plurality of radiating fins formed in an inner surface thereof.

The foregoing and/or other exemplary aspects of the present invention can be achieved by providing a heater cartridge for molding, the heater cartridge comprising a cooling medium pipe part through which a cooling medium flows and a heating part surrounding the cooling medium pipe part.

According to an exemplary embodiment of the present invention, the cooling medium pipe part comprises a plurality of radiating fins formed in an inner surface thereof.

BRIEF DESCRIPTION OF THE DRAWINGS

The above and/or other aspects and advantages of the prevent invention will become apparent and more readily appreciated from the following description of the exemplary embodiments, taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Reference will now be made in detail to exemplary embodiments of the present invention which are illustrated in the accompanying drawings.

Figure 1:
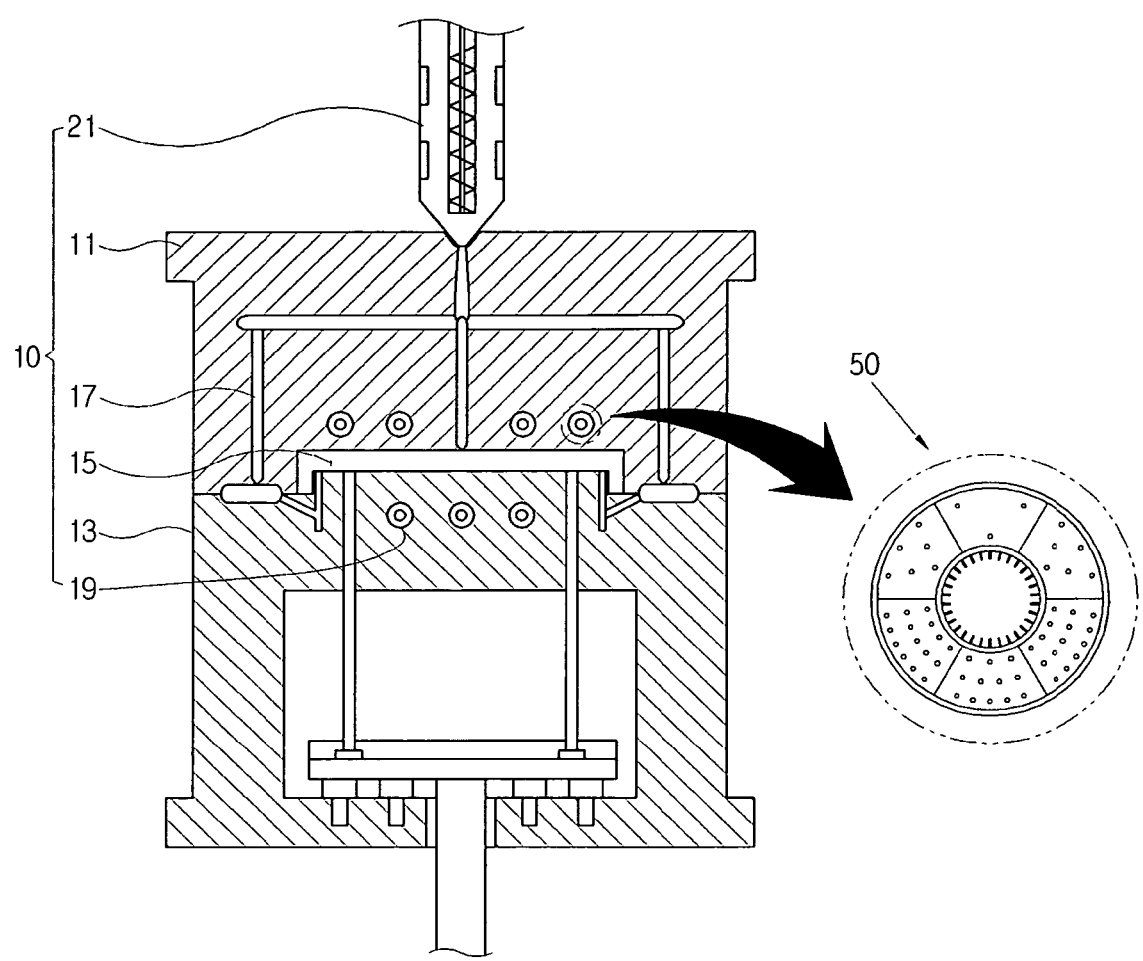
FIG. 1 is a sectional view illustrating a molding apparatus according to a first exemplary embodiment of the present invention.

As shown in FIG. 1, a molding apparatus 10 according to a first exemplary embodiment of the present invention includes molds 11 and 13 provided with at least one cartridge channel 19, and a heater cartridge 50 inserted to the cartridge channel 19. The molding apparatus 10 includes the upper mold 11 moving upward and downward, the lower mold 13 coupled to the upper mold 11, and a cavity 15 formed by coupling of the upper mold 11 and the lower mold 13 so that an object may be formed therein. The molding apparatus 10 includes an injecting unit 21 formed with an injecting hole (not shown) through which a forming material such as resin is injected, and a flowing runner 17 guiding the forming material from the injecting hole to the cavity 15. The molding apparatus 10 includes the cartridge channel 19 formed through an inside of the molds 11 and 13, and is inserted with the heater cartridge 50 therethrough. Thus, the molding apparatus 10 can be heated by the heater cartridge 50, and be cooled by circulating of a cooling medium.

Figure 2:
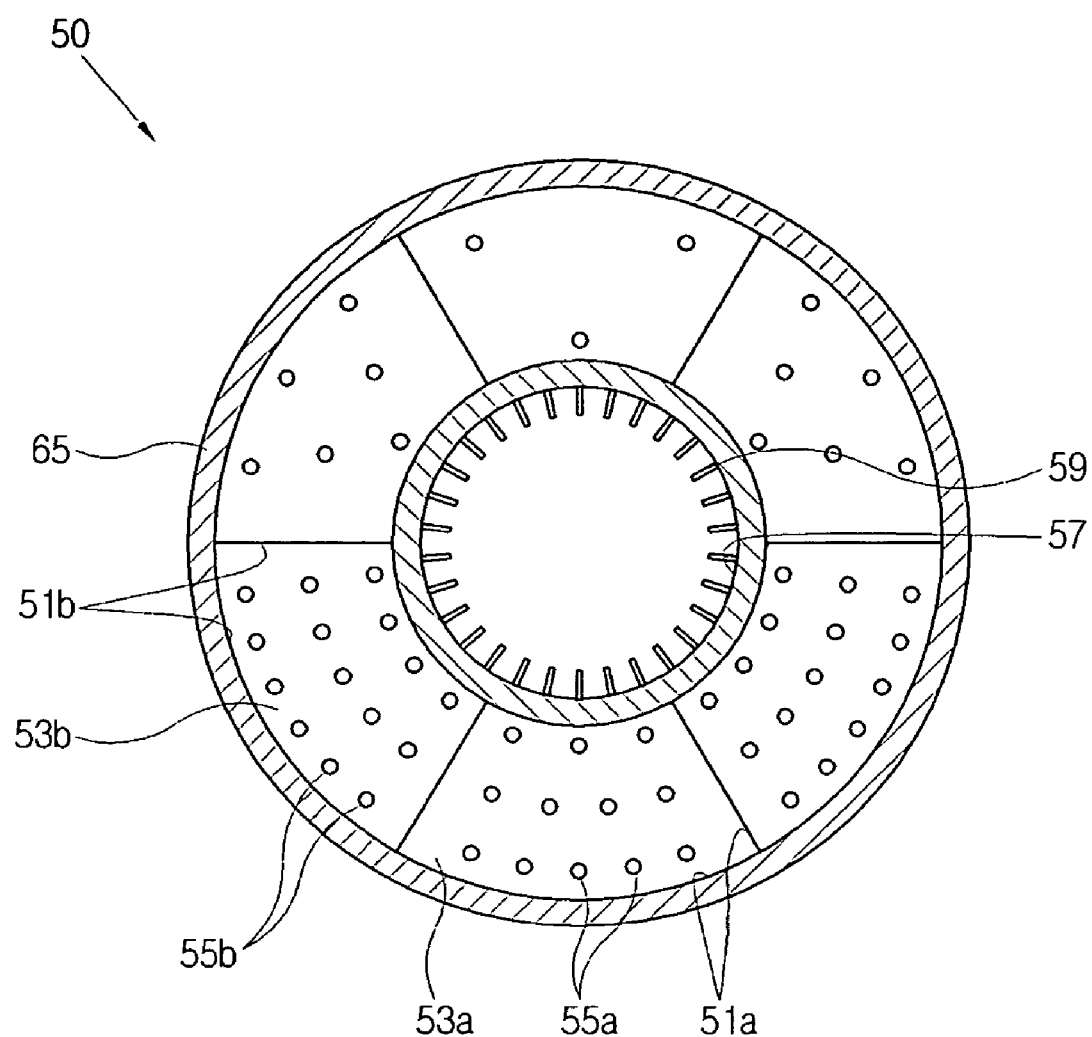
FIG. 2 is a sectional view illustrating the exemplary heater cartridge in FIG. 1.

At least one cartridge channel 19 is respectively formed through the upper mold 11 and the lower mold 13 so that the heater cartridge 50 is inserted therethrough. As shown in FIG. 2, the heater cartridge 50 includes a cooling medium pipe part 57 through which the cooling medium flows, and a heating part (e.g., 53a, 53b, . . . ) surrounding the cooling medium pipe part 57. Alternatively, the cartridge channel 19 may be provided to one of the upper mold 11 and the lower mold 13. The interval, size and number of the cartridge channel 19 may be determined according to the amount of heat generated by the heater cartridge 50. Since the heater cartridge 50 inserted to the cartridge channel 19 can sequentially heat and cool, it is unnecessary to provide a separate cooling medium channel to the upper mold 11 or the lower mold 13. Thus, required space and cost can be reduced.

As further shown in FIG. 2, heating sectors 51a, 51b, . . . are divided at a predetermined angle to accommodate heating parts 53a, 53b, . . . provided with heating lines 55a, 55b, . . . . The heating sectors 51a, 51b, . . . may be divided by a partition (not shown). Thus, the heater cartridge 50 can include the heating parts 53a, 53b, . . . differently providing heat to the respective heating sectors 51a, 51b, . . . .

The heating parts 53a, 53b, . . . are located in the heating sectors 51a, 51b, . . . to surround the cooling medium pipe part 57, and include a plurality of heating lines 55a, 55b, . . . . An insulating member (not shown) surrounds the heating lines 55a, 55b . . . . The heating parts 53a, 53b, . . . heat the cavity 15, so as to have a desired temperature, through the heating lines 55a, 55b, . . . which receive electric power. A control part 70 controls the heating of the heating parts 53a, 53b, . . . based on a temperature sensed by temperature sensor 71 provided inside the molds 11 and 13 and an input part 73.

Figure 4:
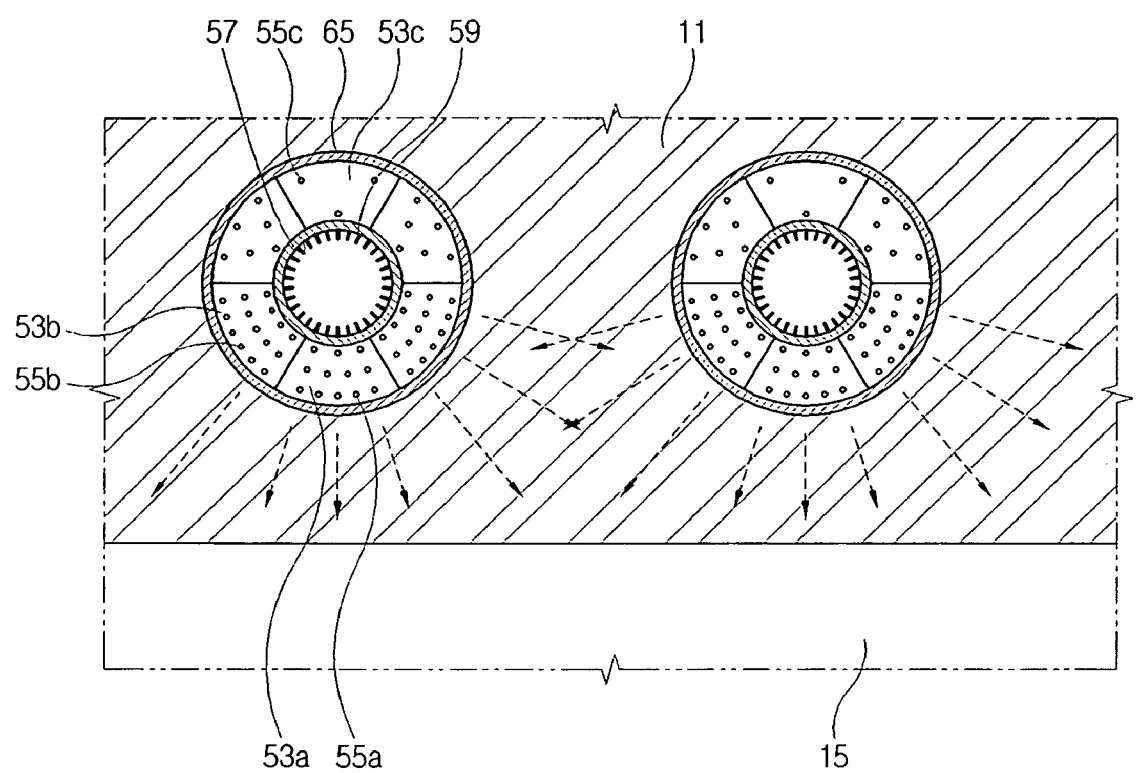
FIG. 4 is a sectional view illustrating heating of the exemplary heater cartridge in FIG. 1.

The heating lines 55a, 55b, . . . are provided as a thermal resistance to convert the electrical power to a thermal energy, and may be formed of a nichrome wire or other known materials. The heating lines 55a, 55b, . . . are formed in a coil shape or a linear shape. The heating lines 55a, 55b, . . . have different numbers, diameters and lengths so that the respective heating parts 53a, 53b, . . . supply different amounts of heat. The heating line 55b of the heating part 53b generates more heat than the heating line 55a of the heating part 53a which is disposed closer to the cavity 15 than the heating part 53b. As shown in FIG. 4, the amount of heat generated from the heating part 53b, which is a further distance from the cavity 15 than the heating part 53a, is greater than the amount of heat generated from the heating part 53a. Thus, the amounts of heat transmitted from the respective heating parts 53a and 53b to the cavity 15 can be uniform, and a forming material accommodated in the cavity 15 can maintain a uniform temperature. Accordingly, inferiority of a formed object such as transformation, contraction, or the like can be prevented to thereby enhance the quality of the formed object.

Also, a heating part 53c disposed opposite to the cavity 15 is provided with a minimal heating line 55c to prevent the temperature of the cavity 15 from decreasing. Thus, heat transmitted from the cavity 15 to the outside of the molds 11 and 13 can be minimized to maintain the temperature of the cavity 15 more uniformly. Also, the heating parts 53a, 53b, 53c, . . . use electric power. Thus, compared with the case in which steam or the like is used, thermal efficiency can be enhanced and heating time can be reduced.

Figure 3:
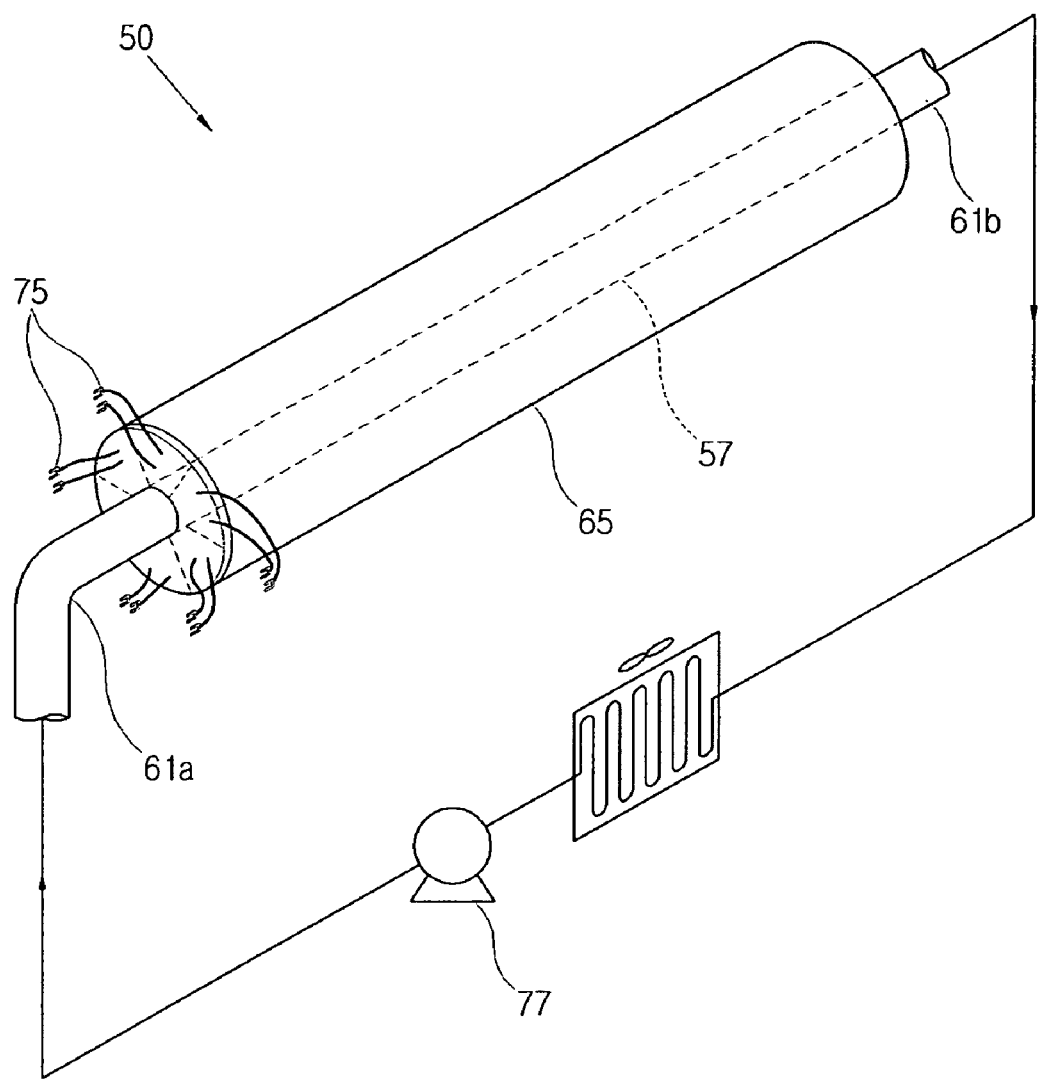
FIG. 3 is a perspective view illustrating the exemplary heater cartridge in FIG. 1.

The cooling medium pipe part 57 includes a plurality of radiating fins 59 protruding from an inner surface to a guide flow of the cooling medium and to enhance cooling efficiency. As shown in FIG. 3, the cooling medium pipe part 57 is surrounded by the heating parts 53a, 53b, 53c, . . . and includes pipes 61a and 61b, a cooling medium pump 77 and a cooler (not shown). Pipes 61a and 61b are connected to the cooling medium pump 77, and the cooling medium is circulated through the pipes 61a and 61b by the cooling medium pump 77.

The size and/or shape of the cross section of the cooling medium pipe part 57 may be determined according to the amount of heat generated from the heating parts 53a, 53b, 53c, . . . , the shape of the cavity 15, or other parameters.

The radiating fins 59 protrude from an inner surface of the cooling medium pipe part 57 to extend a radiating area, thereby promoting cooling of a formed object. The radiating fins 59 are formed of aluminum, stainless steel, or other material having good thermal conductivity.

Accordingly, since the heating parts 53a, 53b, 53c, . . . and the cooling medium pipe part 57 are provided together in one heater cartridge 50, the molding apparatus 10 requires an installation space smaller than the case that a heating part and a cooling medium pipe part are separately provided. Also, the heating part 53 and the cooling medium pipe part 57 can be prevented from interfering with each other to thereby transmit heat uniformly. In the case a cooling medium pipe part is provided separately from a heating part, heat generated from the heating part may be influenced by the cooling medium pipe part to become uneven when being transmitted to a cavity.

A power supplying part 63 is provided to an outside of the heating parts 53a, 53b, 53c, . . . to supply power to the heating lines 55a, 55b, 55c, . . . through connectors 75.

As shown in FIGS. 2 and 3, the heater cartridge 50 includes a main body casing 65 forming an outer surface thereof. The main body casing 65 is formed of a cylindrical stainless steel. Alternatively, the main body casing 65 may be formed of other materials, and have other shapes.

The cooling medium pump 77 is provided to an outside of the molds 11 and 13, and is controlled by the control part 70 based on data of a temperature sensor 71 and a input part 73.

The temperature sensor 71 is disposed adjacently to the cavity 15, and a user can input a time or other data through the input part 73.

Figure 5:
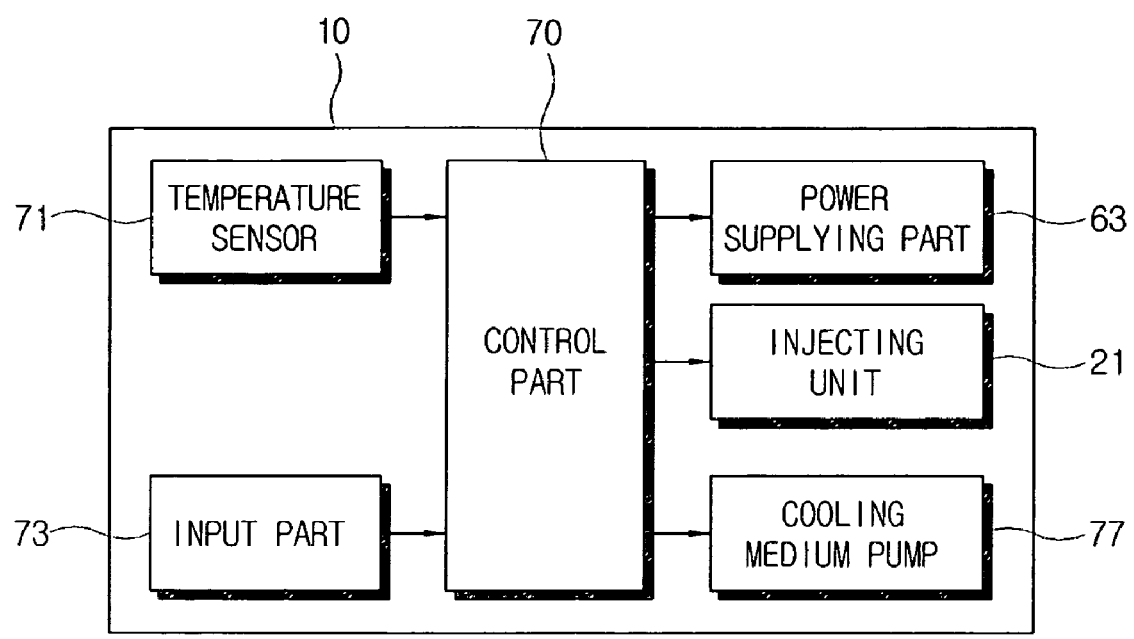
FIG. 5 is a control block diagram of the exemplary molding apparatus in FIG. 1.

Hereinafter, a heating process and a cooling process of the heater cartridge 50 will be described by referring to FIGS. 1, 4 and 5.

Before a forming material such as a melted resin is injected, the cavity 15 is heated by the heater cartridge 50. If the power supplying part 63 supplies power to the heating parts 53a, 53b, 53c, . . . , the heating lines 55a, 55b, 55c, . . . generate heat. Referring to FIG. 4, since the heating parts 53a, 53b, 53c, . . . variously generate heat according to a distance from the cavity 15, the cavity 15 can be heated to have a uniform temperature. The control part 70 controls the power supplying part 63 based on data of the temperature sensor 71 and the input part 73 so that the cavity 15 has a desired temperature. If heating of the cavity 15 is completed to make/maintain the desired temperature, the control part 70 controls the injecting unit 21 to inject the forming material to the cavity 15 through the injecting hole and the flowing runner 17. The forming material can maintain a melted state without being cooled in the flowing runner 17 and the cavity 15 by means of the heating of the heater cartridge 50. The forming material should be slowly cooled by maintaining uniform temperature control after the cavity 15 is completely filled with the forming material. In the case that the forming material is cooled under an uneven temperature, transformation of a formed object may be caused.

The control part 70 controls the cooling medium pump 77 based on data of the temperature sensor 71 and the input part 73 so that the cooling medium is circulated through the cooling medium pipe part 57 to cool the formed object in the cavity 15. The radiating fins 59 enhance cooling efficiency. The control part 70 controls the cooling medium pump 77 so that the formed object has a suitable cooling speed to enhance the quality thereof. After the formed object in the cavity 15 is solidified, the upper mold 11 is separated from the lower mold 13. Then, the formed object is obtained from the cavity.

Figure 6:
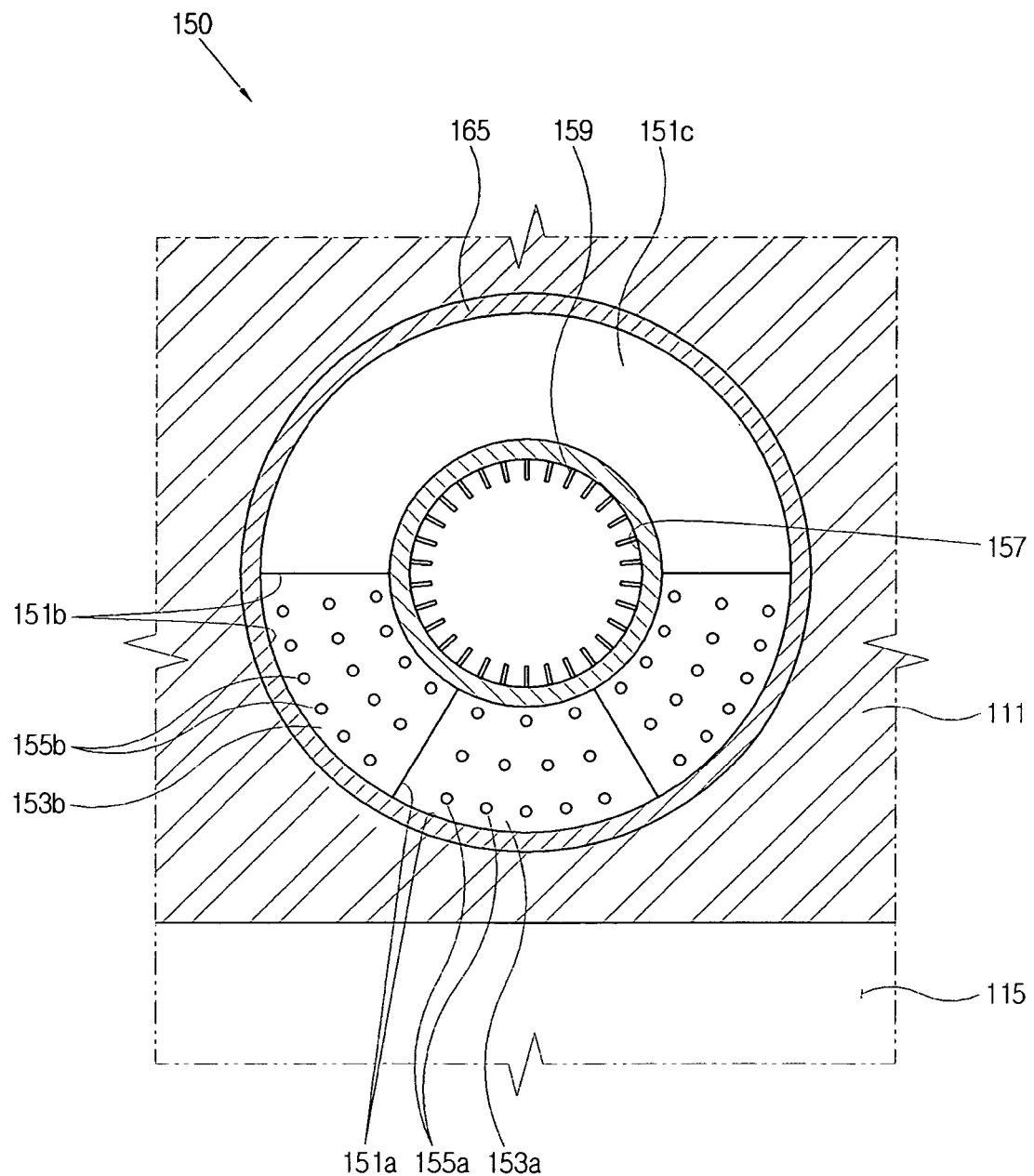
FIG. 6 is a sectional view illustrating a heater cartridge according to a second exemplary embodiment of the present invention.

Hereinafter, a molding cartridge and a molding apparatus according to a second exemplary embodiment of the present invention will be described by referring to FIG. 6.

A molding apparatus according to a second exemplary embodiment of the present invention includes molds provided with at least one cartridge channel, and a heater cartridge 150 inserted to the cartridge channel. As shown in FIG. 6, the heater cartridge 150 includes a main body casing 165, a plurality of heating sectors 151a, 151b, . . . divided inside the main body casing 165, a cooling medium pipe part 157, having radiating fins 159, through which a cooling medium flows, at least one heating part 153a, 153b, . . . provided in the heating sectors 151a, 151b, . . . , respectively, which surround the cooling medium pipe part 157 to heat an area of the molds (e.g. 111), and at least one heating sector 151c in which a heating part is omitted. Also shown are heating lines 155a, 155b, . . . , which are provided in relation to the amount of heat to be generated by each associated heating part. At least one of the heating sectors (e.g. 151c) is without a heating part according to the shape, size, or other parameter of the cavity 115. Thus, an unnecessary energy loss can be prevented.

Figure 7:
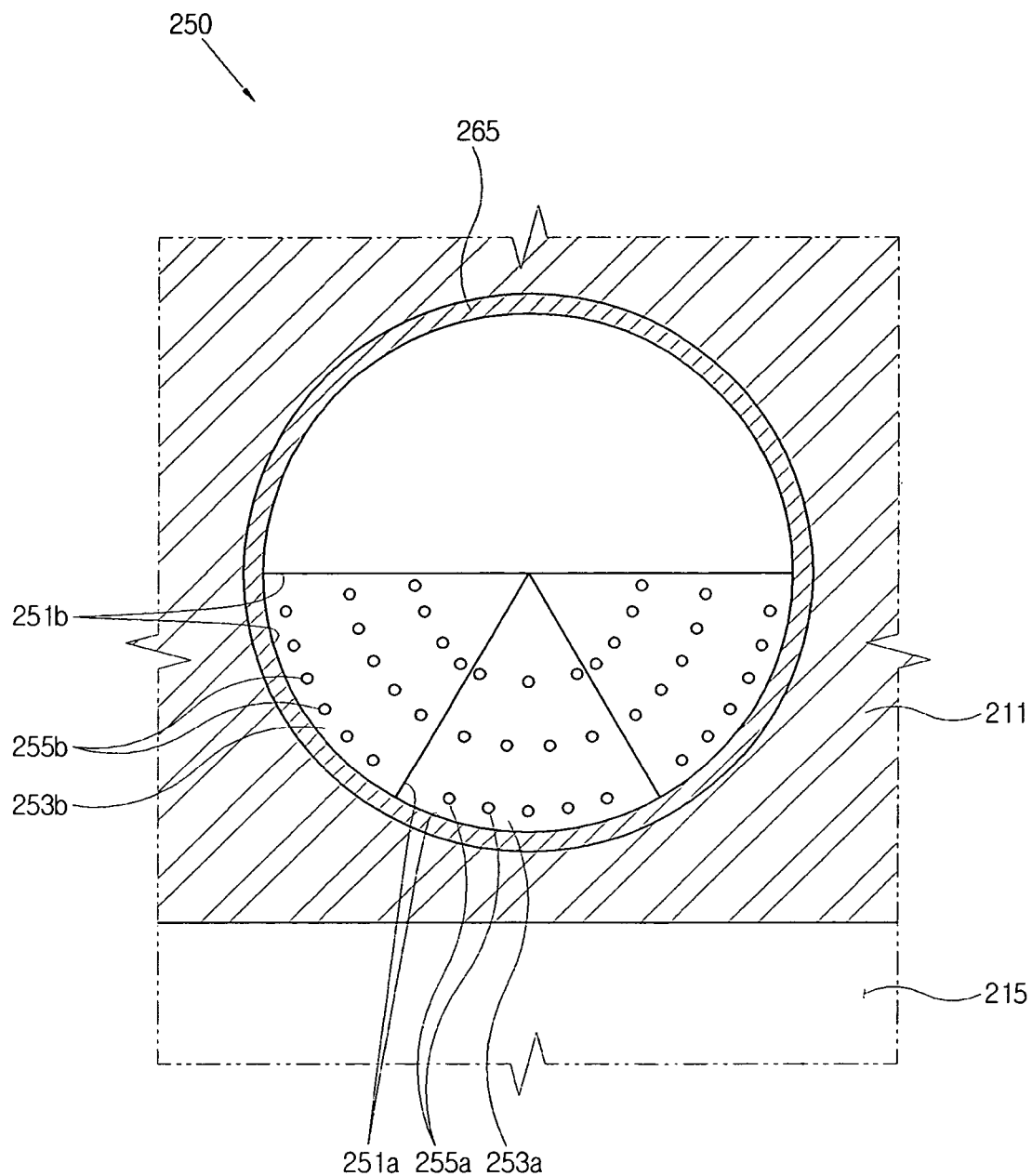
FIG. 7 is a sectional view illustrating a heater cartridge according to a third exemplary embodiment of the present invention.

Hereinafter, a molding apparatus according to a third exemplary embodiment of the present invention will be described by referring to FIG. 7.

A molding apparatus according to a third exemplary embodiment of the present invention includes molds provided with at least one cartridge channel, and a heater cartridge 250 inserted to the cartridge channel. As shown in FIG. 7, the heater cartridge 250 includes a main body casing 265, a plurality of heating sectors 251a, 251b, . . . divided inside the main body casing 265, and at least one heating part 253a-253b, . . . provided respectively in the heating sectors 251a, 251b, . . . to heat an area of the molds (e.g., 211). Also shown are heating lines 255a, 255b, . . . , which are provided in relation to the amount of heat to be generated by each associated heating part. Thus, the molding apparatus can efficiently heat a cavity 215 to have a uniform temperature when forming an object which has such a small size so that cooling is unnecessary.

Hereinafter, a molding apparatus according to a fourth exemplary embodiment of the present invention will be described by referring to FIGS. 8 to 10.

Figure 8:
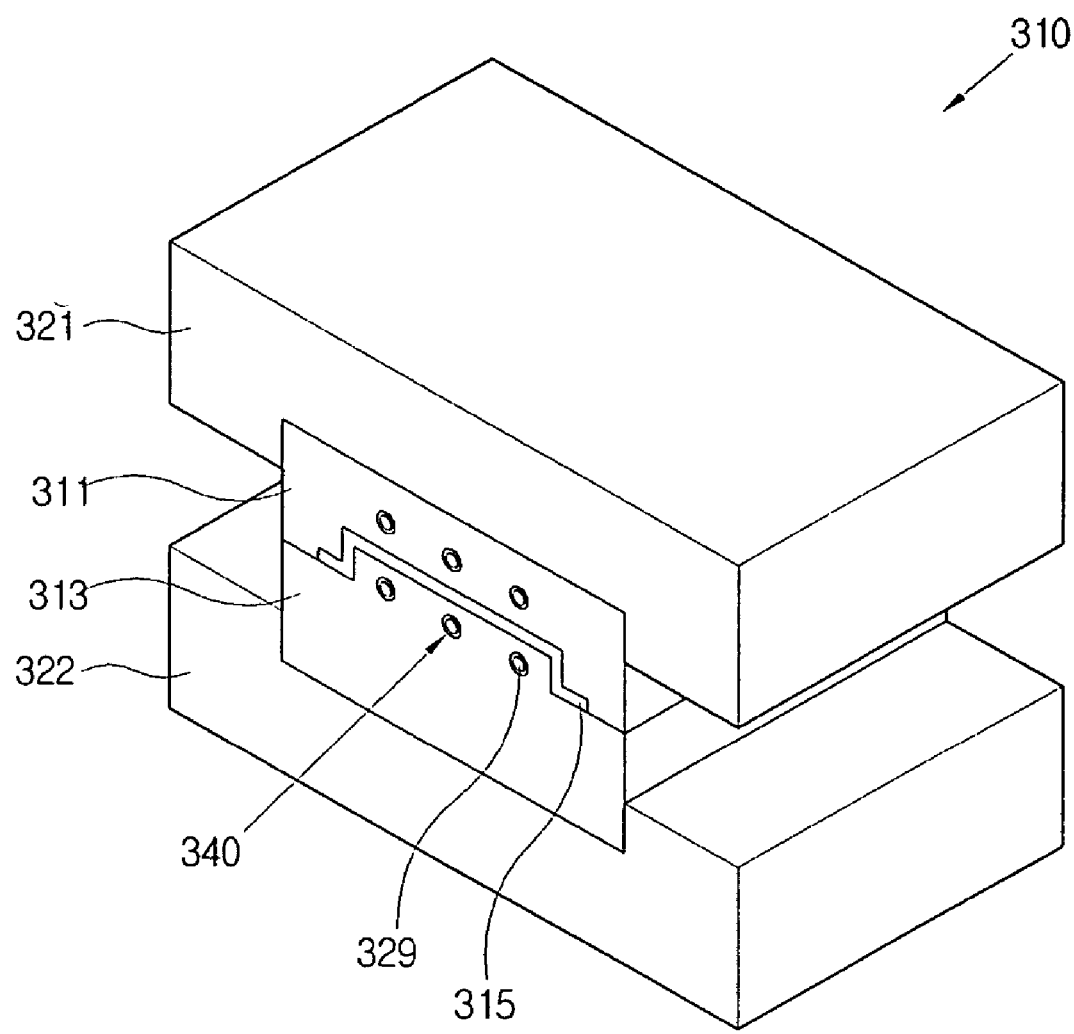
FIG. 8 is a perspective view illustrating a molding apparatus according to a fourth exemplary embodiment of the present invention.
Figure 9:
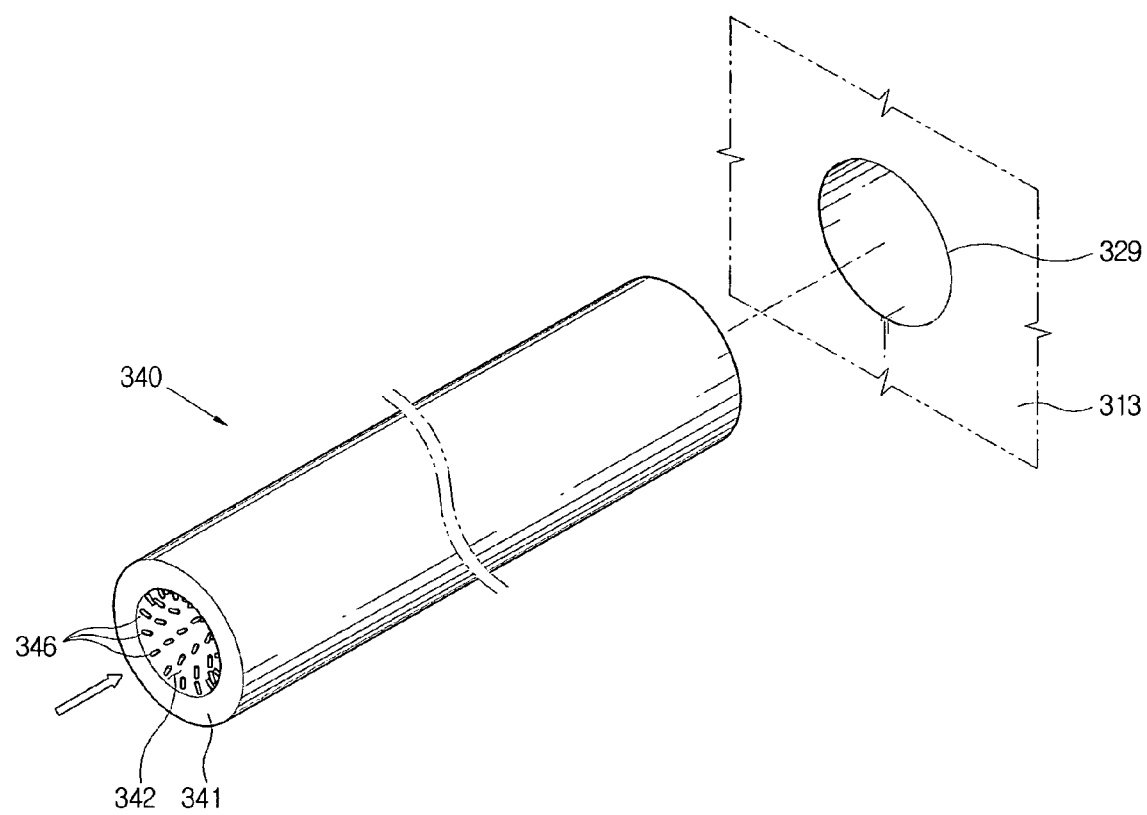
FIG. 9 is a perspective view illustrating the exemplary heater cartridge in FIG. 8.
Figure 10:
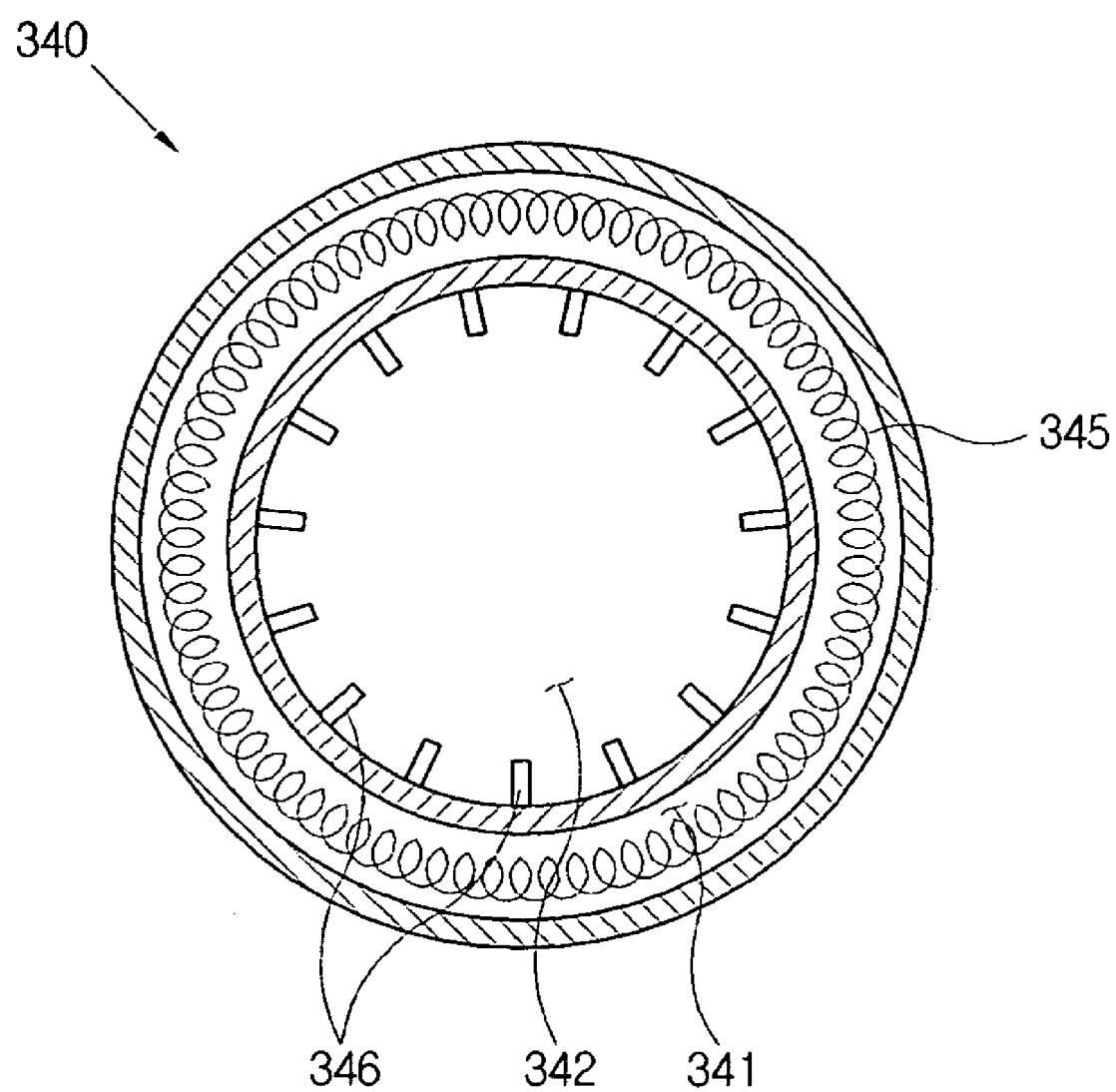
FIG. 10 is a sectional view illustrating the exemplary heater cartridge in FIG. 8.

As shown in FIGS. 8 to 10, a molding apparatus 310 according to a fourth exemplary embodiment of the present invention includes an upper mold 311 and a lower mold 313 coupled with each other to form a cavity 315 in which an object is formed, an upper supporting part 321 and a lower supporting part 322 respectively supporting the upper mold 311 and the lower mold 313, and at least one cartridge channel 329 respectively formed through the upper mold 311 and the lower mold 313.

Referring to FIG. 8, the upper supporting part 321 and the lower supporting part 322 are respectively coupled to the upper mold 311 and the lower mold 313 to move upward and downward with the upper mold 311 and/or the lower mold 313.

The upper mold 311 and the lower mold 313 include the cartridge channel 329 formed therethrough, and are coupled with each other to form the cavity 315 in which a forming material such as resin is injected.

Referring to FIGS. 8 to 10, at least one cartridge channel 329 is respectively formed through the upper mold 311 and the lower mold 313, and is inserted with a heater cartridge 340 including a cooling medium pipe part 342 for guiding flow of a cooling medium and a heating part 341 surrounding the cooling medium pipe part 142. The interval, size, number, and other parameters of the cartridge channel 329 may be variously determined to correspond to the heater cartridge 340.

Accordingly, it is unnecessary that the molding apparatus 310 is provided with a separate heating channel and cooling channel for heating and cooling, thereby enhancing space utilization and reducing an installation cost.

Referring to FIGS. 9 and 10, the heater cartridge 340 includes the cooling medium pipe part 342 through which a cooling medium flows, and the heating part 341 surrounding the cooling medium pipe part 342 and generating heat.

The heating part 341 surrounds the cooling medium pipe part 342, and includes a plurality of heating lines 345 for converting a received electric energy to a thermal energy to heat the upper mold 311 and the lower mold 313. The heating lines 345 are supplied with electric power from a power supplying part (not shown), and an insulating member (not shown) surrounds the heating lines 345.

The cooling medium pipe part 342 guides a flow of a cooling medium, and includes a plurality of radiating fins 346 formed in an inner surface of the cooling medium pipe part 342 to generate a turbulent flow and extend a radiating area, thereby enhancing cooling efficiency.

The size of the cross section of the heating part 341 and the cooling medium pipe part 342 may vary and may be determined according to the shape, size, material, or other parameters of the cavity 315.

Accordingly, one heater cartridge 340 can both heat and cool the molds 311 and 313 to reduce heating and cooling times, thereby shortening process time and reducing an installation space.

Alternatively, the cartridge channel 329 and the heater cartridge 340 may be provided to at least one of the upper mold 311 and the lower mold 313.

Hereinafter, a heating process and a cooling process of the molding apparatus 310 will be described by referring to FIGS. 8 and 10.

Before a melted resin is injected, electric power is supplied to the heating part 341 of the heater cartridge 340 inserted to the cartridge channel 329. The heating part 341 converts electric energy to a thermal energy by a Joule heat. The thermal energy is transmitted to the upper mold 311 and the lower mold 313 to heat the cavity 315 and a flowing runner (not shown) guiding flow of the resin to a desired temperature. Thus, while the resin is injected to the cavity 315 formed between the molds 311 and 313 by means of an injection unit (not shown), the resin in the cavity 315, an injection hole (not shown) and the flowing runner can maintain a fluidal state without being cooled.

If the resin is completely filled into the cavity 315, a control part (not shown) stops supplying power to the heating part 341. Thus, the temperature of the molds 311 and 313 decreases, and the resin is cooled to solidify.

The control part controls a cooling medium pump (not shown) so that a cooling medium is supplied into the cooling medium pipe part 342 of the heater cartridge 340 inserted to the cartridge channel 329. Since the temperature of the cooling medium is lower than that of the heating part 341, the cooling medium cools the resin in the cavity 315. Here, the radiating fins 346 formed in the inner surface of the cooling medium pipe part 342 generate a turbulent flow to the cooling medium, and extend a radiating area to enhance cooling efficiency. After the resin is solidified, the upper supporting part 321 supporting the upper mold 311 moves upward so that the upper mold 311 is separated from the lower mold 313. Then, the solidified resin is obtained from the cavity.

Accordingly, an exemplary heater cartridge and molding apparatus having the same variously heats the cavity or the flowing runner according to a distance from cavity, to uniformly maintain the temperature of the cavity, thereby enhancing thermal efficiency and the quality of a formed object. Also, since the cooling medium pipe part and the heating part are integrally provided to sequentially heat and cool, the heater cartridge and the molding apparatus having the same has a simple configuration, and can minimize interference between the heating process and the cooling process. Thus, heating efficiency and cooling efficiency can be enhanced, the heating process and the cooling process can be rapidly completed, and required space can be reduced. Also, since an electrical energy is used, thermal efficiency can be enhanced, and process time can be shortened.

As described above, exemplary embodiments of the present invention provide a heater cartridge and a molding apparatus having the same which provides uniform heating to enhance thermal efficiency and the quality of a product.

Also, exemplary embodiments of the present invention provide a heater cartridge and a molding apparatus having the same which provides sequential heating and cooling through one heater cartridge to rapidly and simply heat and cool and to minimize required space and process time.

Also, exemplary embodiments of the present invention provide a heater cartridge and a molding apparatus having the same which provides a simplified configuration for heating and cooling a mold to enhance an installation cost, a process cycle and a heating efficiency.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A molding apparatus, comprising:
   a mold comprising a cavity formed by coupling a first mold and a second mold so that an object can be formed therein and a plurality of cartridge channels; and
   a plurality of heater cartridges disposed in the plurality of cartridge channels, each of the plurality of heater cartridges comprising:
   a main body casing;
   a plurality of heating sectors dividing an inside of the main body casing; and
   a plurality of heating parts respectively provided in the plurality of heating sectors to heat an area of the mold,
   wherein the plurality of heater cartridges are disposed at the first mold and the second mold around the cavity; and
   wherein the amount of heat supplied from each of the plurality of heating parts is proportionate to a distance between the cavity and each of the plurality of heating sectors, respectively.

2. The molding apparatus according to claim 1, further comprising a cooling medium pipe provided through the main body casing to guide a cooling medium.

3. The molding apparatus according to claim 2, wherein each of the plurality of heating sectors is adjacent to the cooling medium pipe and each of the plurality of heating parts is provided to each of the plurality of heating sectors, respectively, which surround the cooling medium pipe.

4. The molding apparatus according to claim 2, wherein the cooling medium pipe comprises a plurality of radiating fins formed in an inner surface thereof.

5. The molding apparatus according to claim 1, further comprising at least one heating line provided in each of the plurality of heating parts, wherein the number of heating lines provided in each of the plurality of heating parts is proportionate to the distance between the area of the mold and each of the plurality of heating sectors provided with each of the plurality of heating parts, respectively.

6. The molding apparatus according to claim 5, wherein the heating line is a resistive metal.

7. The molding apparatus according to claim 1, further comprising at least one heating line provided to each heating part in a first set of the plurality of heating parts, wherein the number of heating lines provided in each of the plurality of heating parts of the first set is proportionate to the distance between the area of the mold and each of the plurality of heating sectors provided with each of the plurality of heating parts of the first set, respectively, and further wherein a second set of the plurality of heating parts is not provided with a heating line.

8. The molding apparatus according to claim 1, wherein the main body casing is provided in a cylindrical shape.

9. A molding apparatus, comprising:
   a mold comprising a cavity formed by coupling a first mold and a second mold so that an object can be formed therein and a plurality of cartridge channels formed through the mold; and
   a plurality of heater cartridges disposed in the plurality of cartridge channels, each of the plurality of heater cartridges comprising:
   a cooling medium pipe for guiding a cooling medium; and
   a plurality of heating parts, provided in a plurality of heating sectors to heat the object, surrounding the cooling medium pipe,
   wherein the plurality of heater cartridges are disposed at the first mold and the second mold around the cavity; and
   wherein the amount of heat supplied from each of the plurality of heating parts is proportionate to a distance between the cavity and each of the plurality of heating sectors provided with the heating parts.

10. The molding apparatus according to claim 9, wherein the cooling medium pipe comprises a plurality of radiating fins formed in an inner surface thereof.

* * * * *